(12) United States Patent
Schwalm

(10) Patent No.: US 7,445,659 B2
(45) Date of Patent: Nov. 4, 2008

(54) EJECTOR TO REDUCE PERMEATE BACKPRESSURE OF AIR SEPARATION MODULE

(75) Inventor: Gregory Schwalm, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/704,748

(22) Filed: Feb. 9, 2007

(65) Prior Publication Data

US 2007/0256558 A1 Nov. 8, 2007

Related U.S. Application Data

(63) Continuation of application No. 10/872,716, filed on Jun. 21, 2004, now Pat. No. 7,175,692.

(51) Int. Cl.
*B01D 53/22* (2006.01)

(52) U.S. Cl. .................................. 95/22; 95/54; 96/4
(58) Field of Classification Search .................. 95/19, 95/22, 54; 96/4
See application file for complete search history.

(56) References Cited

U.S. PATENT DOCUMENTS

| 4,556,180 | A | 12/1985 | Manatt |
| 6,442,944 | B1 | 9/2002 | Skur, III |
| 6,547,188 | B2 | 4/2003 | Schmutz et al. |
| 2005/0115404 | A1 | 6/2005 | Leigh et al. |

*Primary Examiner*—Robert A Hopkins
(74) *Attorney, Agent, or Firm*—Carlson, Gaskey & Olds

(57) ABSTRACT

An air separation system includes an ejector for controlling a pressure differential across an air separation module and a valve for controlling air flow through the ejector such that airflow through the ejector is discontinued when not required to maintain the desired pressure differential across the air separation module.

17 Claims, 1 Drawing Sheet

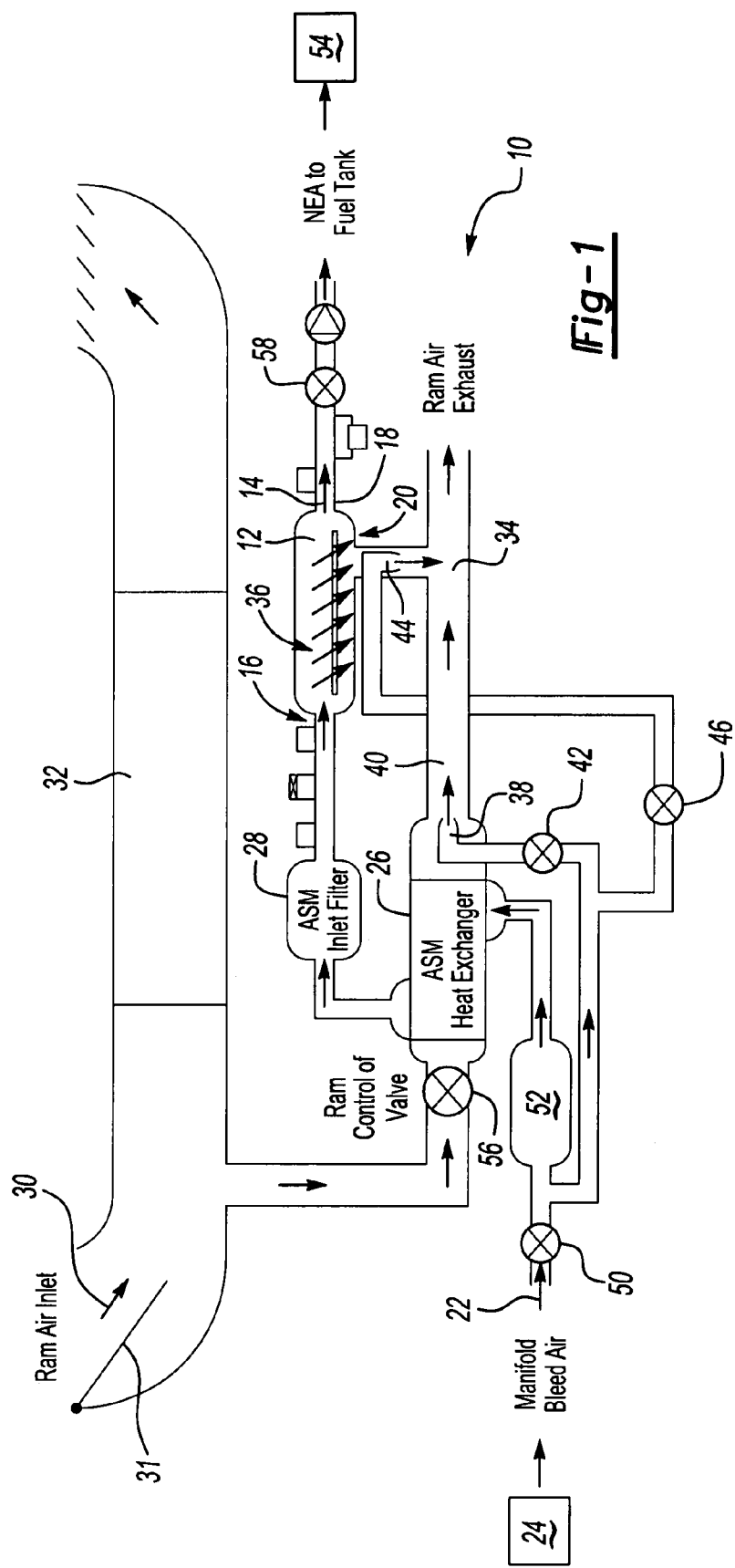

EJECTOR TO REDUCE PERMEATE BACKPRESSURE OF AIR SEPARATION MODULE

REFERENCE TO RELATED APPLICATION

This application is a continuation application of U.S. Ser. No. 10/872,716, which was filed on Jun. 21, 2004 now U.S. Pat. No. 7,175,692.

BACKGROUND OF THE INVENTION

This invention generally relates to an air separation module and specifically to an air separation module for a fuel inerting system.

A fuel tank for an aircraft contains fuel vapors along with liquid fuel. Oxygen rich air within the fuel tank combined with the fuel vapors can cause an undesirable reaction. Fuel tank inerting systems are known that replace the oxygen rich air with an inert gas to substantially reduce the oxygen content within the fuel tank and thereby substantially reduce the possibility of fuel vapor ignition.

Typically, an onboard fuel tank inerting system replaces oxygen rich air with nitrogen enriched (oxygen depleted) air that renders the tank inert. Removing a significant amount of oxygen from an air stream creates the nitrogen-enriched air. The air stream is typically obtained from a component of a main engine such as an intake manifold or compressor of a gas turbine engine. An air separation module is provided for removing oxygen from the air stream.

The air separation module typically includes a permeable membrane having two sides. On a first side, the oxygen rich air from the engine flows and on a second side an exhaust air stream flows that creates a pressure differential across the permeable membrane. It is the pressure differential that causes oxygen to diffuse from the bleed air to the exhaust air stream. Exhaust air can originate from any system that can provide low-pressure airflow. In one known system, ram air from an environmental control system is communicated with the air separation module to create the required pressure differential.

The magnitude of the pressure differential across the permeable membrane controls how much oxygen can be diffused out of the bleed air from the engine. Increased differential pressures provide greater amounts of oxygen diffusion. At lower aircraft altitudes and during descent, increased differential pressures are desirable to reduce the size and weight of the air separation module.

An ejector is sometimes used to communicate high-pressure air to the air separation module to increase the pressure differential and increase the amount of oxygen that can be diffused out of the bleed air stream. The increased capacity resulting from the increase in differential pressure provides for the use of smaller more compact air separation modules.

Disadvantageously, the use of high pressure bleed air reduces overall engine efficiency such that in many applications the benefits of a smaller, lighter air separation module are outweighed by the efficiency loss caused by routing bleed air through ejectors to an exhaust opening during cruise.

Accordingly, it is desirable to develop an air separation module with improved oxygen removal capacity during descent while maintaining desired engine efficiencies during cruise.

SUMMARY OF INVENTION

This invention is an air separation system that includes an ejector for controlling a pressure differential across an air separation module and a valve for controlling air flow through the ejector such that airflow through the ejector is discontinued when not required to maintain the desired pressure differential across the air separation module.

The air separation system includes the air separation module that has an inlet, an outlet and an exhaust. High-pressure air is communicated to the inlet of the air separation module where oxygen is removed. Air leaving the air separation module includes a significantly reduced amount of oxygen. Relatively low-pressure air is communicated to the exhaust opening of the air separation module and creates the desired partial pressure differential required to remove oxygen.

An ejector releases high-pressure air adjacent the exhaust opening of the air separation module to increase the momentum of the exhaust flow, and thereby the pressure differential across the air separation module. Exhausting high-pressure air through the ejector adjacent the exhaust maintains the desired pressure differential that provides the desired magnitude of oxygen diffusion from the high-pressure bleed air.

The use of high-pressure bleed air reduces engine efficiency. Therefore, a shut off valve discontinues the flow of high-pressure air to the ejector when not required to maintain the desired pressure differential. During high speed cruising at altitude, the pressure differential provided by the pressure level of the ram airflow from the environmental control system is sufficient to provide the desired oxygen diffusion, and therefore high-pressure bleed air from the ejector is not required.

Accordingly, the air separation system of this invention provides improved oxygen removal capacity while maintaining desired engine efficiencies.

The various features and advantages of this invention will become apparent to those skilled in the art from the following detailed description of the currently preferred embodiment and the drawing that accompanies the detailed description as briefly described below.

BRIEF DESCRIPTION OF THE DRAWING

FIG. 1 is a schematic illustration of an air separation system according to this invention.

DETAILED DESCRIPTION OF THE PREFERRED EMBODIMENT

Referring to FIG. 1, an air separation system 10 includes an air separation module 12 for removing oxygen from an air stream 14. The air separation module 12 includes an inlet 16, outlet 18 and an exhaust 20. Bleed air 22 from an engine 24 or from a motor-driven compressor is cooled within a heat exchanger 26 and flowed through a filter 28 before entering the inlet 16 of the air separation module 12.

Ram air 30 from an environmental control system 32 is flowed through the heat exchanger 26 and is in thermal communication with bleed air 22 from the engine 24. Ram air 30 exiting the heat exchanger 28 flows through an exhaust passage 34 and exhausted overboard.

The exhaust 20 of the air separation module 12 is in communication with the exhaust passage 34 and creates a pressure differential between the air separation module inlet 16 and the exhaust 20. The pressure differential drives diffusion of oxygen 36 from the bleed air 22. The magnitude of pressure differential governs the amount of oxygen that can be removed from the bleed air 22.

A heat exchanger ejector 38 provides high-pressure bleed air 22 adjacent a heat exchanger outlet 40 to create a pressure differential. Ram air 30 is drawn by the pressure differential through the heat exchanger 26. A valve 42 is provided to regulate the flow of bleed air 22 to the heat exchanger ejector 38. The valve 42 can be a proportional valve regulating air flow or an on/off valve performing a shutoff function.

An air separation module (ASM) ejector 44 provides high-pressure bleed air 22 adjacent the air separation module exhaust 20. Release of high-pressure air adjacent the air separation exhaust 20 through ejector 40 increases the magnitude of the pressure differential between the inlet 16 and exhaust 20. A second valve 46 controls the flow of bleed air 22 to the ASM ejector 44. The injection of high-pressure bleed air is only required during operation of the aircraft at low altitudes where ambient pressure is sufficiently high that operation of the ejector provides a significant increase in desired pressure differential across the air separation module 12.

Diffusion of the oxygen from the bleed airflow 22 is a function of air separation module capacity and magnitude of pressure differential. The greater the pressure differential, the greater the amount of oxygen that can be removed and exhausted. Further, increasing the pressure differential provides for the use of smaller, lighter air separation modules to obtain like oxygen diffusion rates as compared to larger air separation modules.

The ASM ejector 44 provides greater pressure differentials than could otherwise be provided by ram airflow 30 alone. The capability of greater pressure differentials provides for a reduction in ASM 12 size. However, bleed air 22 flowing from the engine 24 through the ejectors 38,44 and out the exhaust passage 34 is for all purposes a leak between the engine 24 and the atmosphere. This leak to atmosphere reduces engine efficiency and performance. Accordingly, the heat exchanger ejector valve 42 and the ASM ejector valve 46 shuts off the flow of bleed air 22 to the ejectors 38,44 when the pressure of the ram airflow 30 is sufficiently low to provide the required pressure differential. As appreciated, the ram air 30 provides the desired pressure differential when the aircraft is at cruising speed and altitude.

In operation, bleed air 22 from the engine is feed through a shut off valve 50 to an ozone converter 52 to condition the bleed air 22. Conditioning of the bleed air prevents contaminants or possibly harmful elements from entering the air separation module 12. The bleed air 22 leaving the engine 24 is at a high temperature and pressure. The air separation module 12 operates optimally within a limited temperature range. Therefore, the bleed air 22 is cooled to provide the optimal temperature range for removal of oxygen. In the heat exchanger 26, the bleed air 22 is cooled by thermal contact with ram air 30 from the environmental control system 32. As appreciated, ram air 30 from the environmental control system 32 is obtained from outside the aircraft, and is therefore cooler and at a lower pressure than the bleed air 22. Cooled bleed air 22 exits the heat exchanger 26 and flows through the air filter 28 to the air separation module inlet 16. The air separation module 12 can be of any configuration known to a worker skilled in the art. The specific configuration is governed by the desired gas separation. For example, permeable membranes, hollow fiber membranes or sieves.

A pressure differential between the ram air inlet and the exhaust passage 34 draws the ram air 30 through the heat exchanger 26. The heat exchanger ejector 38 communicates high-pressure bleed air 22 to the outlet 56 of the heat exchanger 26 to increase the differential pressure between the inlet 31 and the exhaust passage 34 to increase ram airflow 30. Bleed air 22 for the ejectors 38, 40 is communicated prior to entering the ozone converter 52. Because the bleed air 22 to the ejectors 38,40 is being exhausted overboard there is no need for conditioning of this air flow.

Ram air 30 exiting the heat exchanger 26 is exhausted through the exhaust passage 34 and is in communication with the air separation module exhaust 20. The difference in pressure between the inlet 16 and exhaust 20 drives oxygen 36 from the bleed air 22 and into the exhaust passage 34. While the pressures existing in exhaust passage 34 are high at low altitudes, the ASM ejector 44 expels high-pressure bleed air 22 adjacent the air separation module exhaust 20 providing the desired pressure differential.

As the aircraft attains cruising speed and altitude, the pressure in exhaust passage 34 decreases, increasing the ASM pressure differential, and the ASM ejector valve 46 shuts off bleed airflow 22 to increase engine efficiency. Preferably, the ASM ejector valve 46 is an on/off valve, however it is within the contemplation of this invention to provide a variable valve to vary control of bleed air 22 at the air separation exhaust 20.

The system of this invention provides a control valve for shutting off bleed air at the exhaust opening to improve engine performance while still providing high pressure air to provide the desired pressure differential to operate the air separation module at optimum levels.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An air separation assembly comprising:
    a separation module for removing a portion of gases from a first air stream, said separation module comprising an inlet, outlet and exhaust;
    an ejector communicating high-pressure air downstream of said exhaust for producing a desired pressure differential between said inlet and said exhaust of said separation module; and
    a valve for controlling air flow through said ejector.

2. The assembly as recited in claim 1, wherein said separation module removes oxygen from said first air stream.

3. The assembly as recited in claim 1, wherein said valve comprises a shutoff valve.

4. The assembly as recited in claim 1, comprising a heat exchanger for cooling said first air stream.

5. The assembly as recited in claim 4, wherein first air stream is placed in thermal communication with a second air stream of a lower temperature than said first air stream within said heat exchanger for controlling a temperature of said first air stream.

6. The assembly as recited in claim 4, comprising a second ejector for communicating high-pressure air adjacent an outlet of said heat exchanger for producing a desired pressure differential across said heat exchanger.

7. The assembly as recited in claim 6, comprising a second valve for controlling airflow to said second ejector.

8. A fuel inerting assembly for an aircraft comprising:
a gas separation module for removing gas from an air stream, said gas separation module including an inlet, outlet and exhaust;
a bleed air passage communicating high-pressure air with said gas separation module inlet;
an exhaust passage communicating low-pressure air with said gas separation exhaust to create a pressure differential between said inlet and said exhaust;
an ejector communicating high-pressure air downstream of the exhaust for increasing said pressure differential across the gas separation module; and
a valve for controlling high-pressure airflow through said ejector such that said high pressure airflow to said exhaust is adjusted responsive to a desired pressure differential.

9. The assembly as recited in claim 8, wherein said valve comprises an on/off valve.

10. The assembly as recited in claim 8, wherein said valve comprises a proportional opening.

11. The assembly as recited in claim 8, wherein said high-pressure air and said first air stream originate from a main engine of said aircraft.

12. The assembly as recited in claim 8, comprising a heat exchanger for controlling a temperature of said first air stream.

13. The assembly as recited in claim 12, comprising a second ejector for communicating high-pressure air to a heat exchanger outlet.

14. The assembly as recited in claim 8, including a fuel tank receiving an air stream from the outlet of the gas separation module.

15. A method of operating a fuel inerting system comprising the steps of:
a) flowing a high pressure air stream through a gas separation module;
b) flowing a low pressure air stream adjacent an exhaust of said gas separation module to create a desired pressure differential between said inlet and said exhaust;
c) flowing a high pressure air stream through an ejector disposed downstream of said exhaust of the gas separation module for increasing said desired pressure differential; and
d) closing of the high pressure air stream through the ejector responsive to the low pressure air stream providing the desired pressure differential.

16. The method as recited in claim 15, comprising the step of removing oxygen from the high-pressure air stream with the gas separation module.

17. The method as recited in claim 15, comprising the step of supplying oxygen depleted air to a fuel tank.

* * * * *